United States Patent
Crowe et al.

(10) Patent No.: US 10,496,845 B2
(45) Date of Patent: Dec. 3, 2019

(54) SECURING PERSONALLY IDENTIFIABLE INFORMATION

(71) Applicant: LENOVO ENTERPRISE SOLUTIONS (SINGAPORE) PTE. LTD., Singapore (SG)

(72) Inventors: John S. Crowe, Durham, NC (US); Gary D. Cudak, Wake Forest, NC (US); Jennifer J. Lee-Baron, Morrisville, NC (US); Nathan J. Peterson, Durham, NC (US); Amy L. Rose, Chapel Hill, NC (US); Bryan L. Young, Tualatin, OR (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 85 days.

(21) Appl. No.: 15/158,915

(22) Filed: May 19, 2016

(65) Prior Publication Data
US 2017/0337393 A1 Nov. 23, 2017

(51) Int. Cl.
G06F 21/62 (2013.01)
H04L 29/06 (2006.01)

(52) U.S. Cl.
CPC ........ *G06F 21/6245* (2013.01); *G06F 21/62* (2013.01); *G06F 21/6227* (2013.01); *G06F 21/6254* (2013.01); *G06F 21/6263* (2013.01); *H04L 63/0428* (2013.01); *H04L 2209/04* (2013.01); *H04L 2209/16* (2013.01)

(58) Field of Classification Search
CPC .. G06F 21/62; G06F 21/6227; G06F 21/6245; G06F 21/6254; G06F 21/6263; H04L 63/0428; H04L 29/06; H04L 2209/04; H04L 2209/16
See application file for complete search history.

(56) References Cited

U.S. PATENT DOCUMENTS

| | | | | |
|---|---|---|---|---|
| 7,716,242 | B2* | 5/2010 | Pae | G06F 21/6245 707/783 |
| 9,239,936 | B2* | 1/2016 | Vasireddy | G06F 21/577 |
| 10,262,308 | B2* | 4/2019 | Carlson | G06Q 20/02 |
| 2014/0059355 | A1* | 2/2014 | Schuette | G06F 21/6218 713/189 |
| 2014/0068706 | A1* | 3/2014 | Aissi | G06F 21/6254 726/1 |
| 2014/0123273 | A1* | 5/2014 | Matus | G06F 21/32 726/17 |
| 2016/0335581 | A1* | 11/2016 | Jones | G06Q 10/06398 |

OTHER PUBLICATIONS

"Privacy / Data Protection Project", University of Miami, Miller School of Medicine (online), accessed Feb. 23, 2016, 8 pages, URL: http://privacy.med.miami.edu/glossary/xd_iso_access_control.htm.

(Continued)

*Primary Examiner* — Jayesh M Jhaveri

(57) ABSTRACT

Methods, apparatus, and computer program products for securing personally identifiable information include: identifying, present on a computer system, personally identifiable information ('PII'); ranking the PII for a user identifiable by the PII; setting a time limit for the PII based on the rank; and responsive to the time limit elapsing, performing one or more actions to secure the PII.

20 Claims, 6 Drawing Sheets

(56) References Cited

OTHER PUBLICATIONS

Ultes et al., "Next Generation Intelligent Environments: Ambient Adaptive Systems", Second Edition, ebook (online), Aug. 2011, 29 pages, Springer International Publishing, Switzerland.

OWASP, "Testing for Logout and Browser Cache Management (OWASP-AT-007)", Open Web Application Security Project (owasp.org, online), accessed Feb. 22, 2016, 5 pages, URL: https://www.owasp.org/index.php/Testing_for_Logout_and_Browser_Cache_Management_%28OWASP-AT-007%29.

Wikipedia, "National Institute of Standards and Technology", Wikipedia.org (online), accessed Feb. 23, 2016, 9 pages, URL: https://en.wikipedia.org/wiki/National_Institute_of_Standards_and_Technology.

\* cited by examiner

SECURING PERSONALLY IDENTIFIABLE INFORMATION

BACKGROUND

Field of the Invention

The field of the disclosure is data processing, or, more specifically, methods, apparatus, and products for securing personally identifiable information.

Description of Related Art

Personally identifiable information ('PII'), or Sensitive Personal Information ('SPI') is information that can be used on its own or with other information to identify, contact, or locate a single person, or to identify an individual in context. Such information can be used in various ways to cause harm to or invade the privacy of the user which may be identified by the information. That that end, organizations and users have an interest in securing PII from being acquired by others not intended to acquire the PII. Oftentimes, PII may be present on a computer system such as copied into a clipboard, entered as text into a field of an application, or included in web browser history. When a user of that computer system leaves the vicinity of that computer system, without locking or otherwise securing the system, such PII may be readily accessible to others.

SUMMARY

Methods, apparatus, and products for securing personally identifiable information are disclosed in this specification. Securing such PII may include: identifying, present on a computer system, personally identifiable information ('PII'); ranking the PII for a user identifiable by the PII; setting a time limit for the PII based on the rank; and responsive to the time limit elapsing, performing one or more actions to secure the PII.

The foregoing features of the present disclosure will be apparent from the following more particular descriptions of example embodiments of the disclosure as illustrated in the accompanying drawings wherein like reference numbers generally represent like parts of example embodiments.

DETAILED DESCRIPTION

Figure 1:
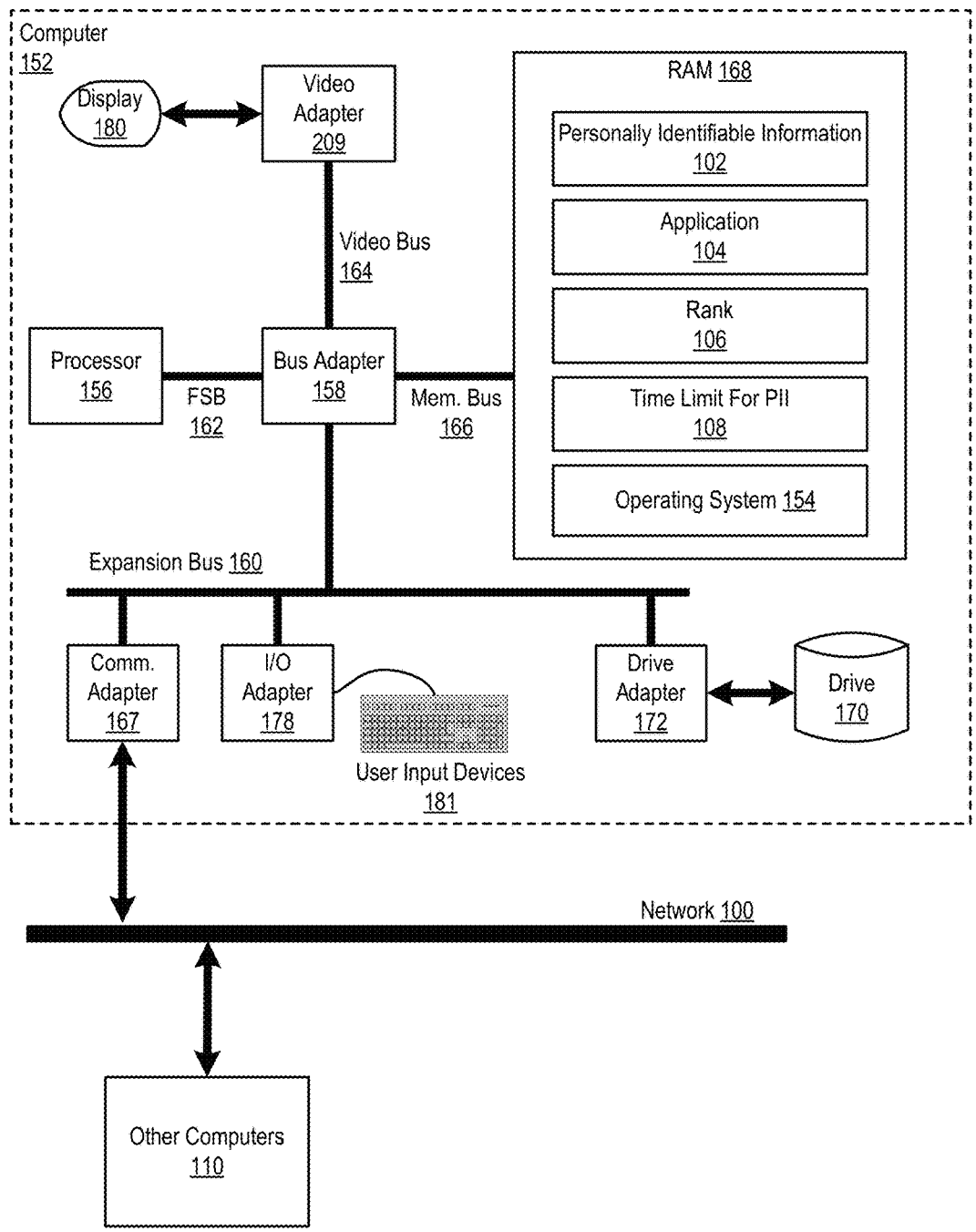
FIG. 1 sets forth a network diagram of a system configured for securing PII according to embodiments of the present disclosure.

Example methods, apparatus, and products for securing PII in accordance with the present disclosure are described with reference to the accompanying drawings, beginning with FIG. 1. FIG. 1 sets forth a network diagram of a system configured for securing PII according to embodiments of the present disclosure. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application (104) configured for securing PII in accordance with embodiments of the present disclosure. The application (104) may secure PII by identifying, present on a computer system, PII (102); ranking (106) the PII (102) for a user identifiable by the PII (102); setting a time limit (108) for the PII based on the rank (106); and responsive to the time limit elapsing, performing one or more actions to secure the PII.

As mentioned above, PII is information that can be used on its own or with other information to identify, contact, or locate a single person, or to identify an individual in context. Examples of PII include: full name (especially if not common), home address, Email address (especially if the email address is a private address from an association or club membership, and the like), national identification number (such as a social security number), passport number, an IP address, vehicle registration number, driver's license number, face, fingerprints, or handwriting, credit card numbers, digital identity, date of birth, birthplace, genetic information, telephone number, login name, screen name, nickname, or handle. Identifying such PII present on a computer system may be carried out dynamically, responsive to one or more conditions, or at periodic intervals. For example, the application (102) may be configured to scan, for PII, the clipboard, open documents, fields in applications, web browser history and the like periodically. In another example, the application (102) may be configured to scan, for PII, the clipboard upon each copy operation carried out in which text, an image, or other data is copied into the computer system's clipboard. Readers of skill in the art will recognize that the application may be configured to carry out the identification of PII either dynamically, periodically, or both.

Once identified, the application (102) may rank (106) the PII (102). Ranking the PII may be carried out by determining how likely the PII is to be useful in identifying a user and the potential harm of the unauthorized use of that information. PII consisting of a full name, for example, may be ranked low (less likely to identify a user) if that name is "John Smith" or other common name. By contrast, a full name such as "Gary Cudak," which is less common may be ranked high meaning the name is more likely to identify a user. PII may also be ranked differently based on the type of PII identified. For example, a social security number may be ranked higher than a full name as a social security number may be utilized in a way more harmful to the identifiable user than that user's full name.

Based on the rank (106) of the PII (102), the application (102) sets a time limit (108) for the PII. At the expiration or elapsing of the time limit, the PII will be secured through one or more actions. To that end, the application sets the time limit such that the higher the rank, and thus more likely to identify a user or cause harm to a user, the shorter the time limit. That is, the higher the security risk of the PII, the shorter the time limit set by the application.

Also stored in RAM (168) is an operating system (154). Operating systems useful in computers configured for securing PII according to embodiments of the present disclosure include UNIX™, Linux™, Microsoft Windows™, AIX™, IBM's iOS™, and others as will occur to those of skill in the art. The operating system (154), application (104), PII (102), rank (106), and time limit (108) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for securing PII according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (110) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for securing PII according to embodiments of the present disclosure include modems for wired dial-up communications, Ethernet (IEEE 802.3) adapters for wired data communications, and 802.11 adapters for wireless data communications.

The arrangement of computers and other devices making up the example system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present disclosure may be implemented on a variety of hardware platforms in addition to those illustrated in FIG. 1.

Figure 2:
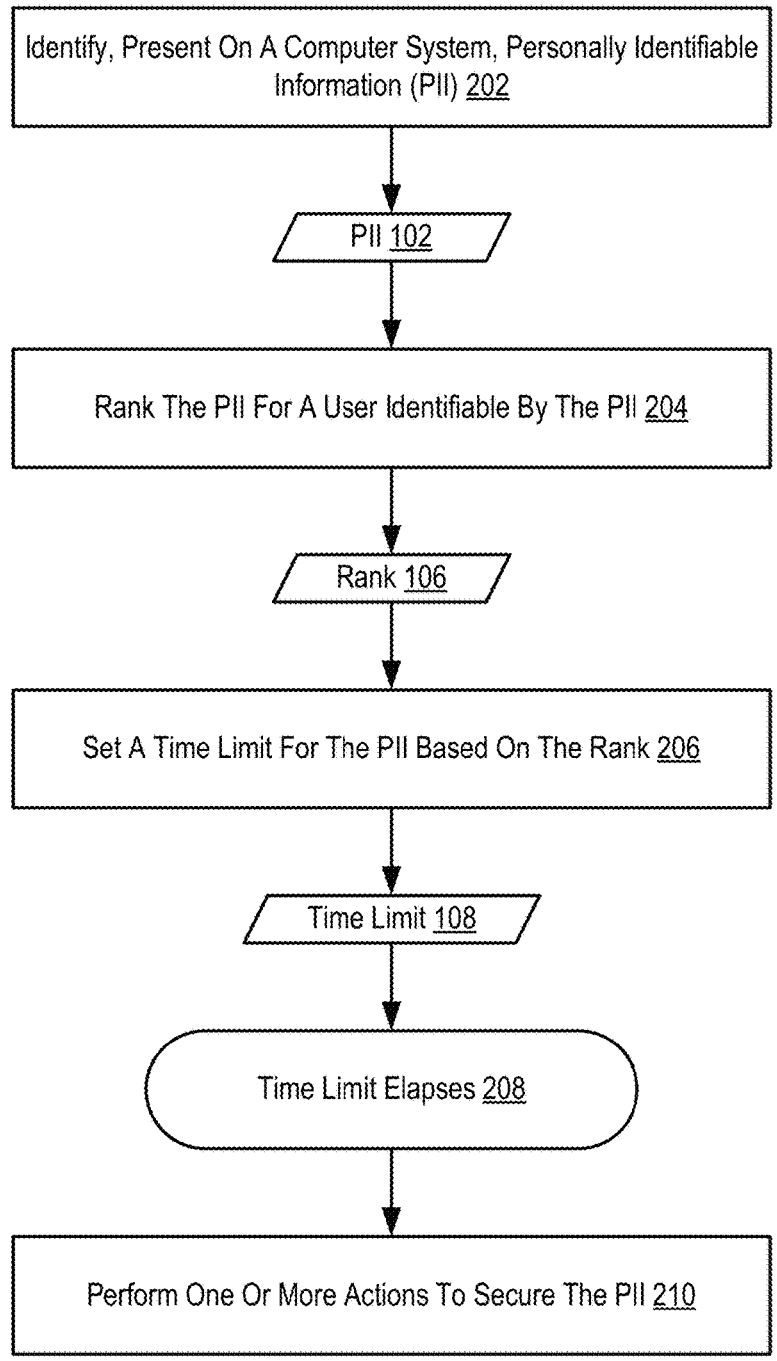
FIG. 2 sets forth a flow chart illustrating an example method for securing PII according to embodiments of the present disclosure.

For further explanation, FIG. 2 sets forth a flow chart illustrating an example method for securing PII according to embodiments of the present disclosure. The method of FIG. 2 may be carried out by an application, such as the application (102) set forth in the example of FIG. 1. The method of FIG. 2 includes identifying (202), present on a computer system, PII (102). Identifying (202) PII (102) present on a computer system may be carried out in a variety of ways at a variety of times. In some embodiments, for example, the identification (202) of PII may be carried out by scanning open applications, open documents, unencrypted files, clipboard contents, web browser history and the like dynamically upon an occurrence of a predefined event, periodically at a predefined interval, or both.

The method of FIG. 2 also includes ranking (204) the PII (102) for a user identifiable by the PII (102). Ranking (204) the PII (102) for a user identifiable by the PII (102) may be carried out in a variety of ways. In some embodiments, ranking (204) the PII (102) may include determining the severity of a potential use of the PII. The application configured to carry out the example of FIG. 2 may also be configured with data structures that associate rankings to PII types. Such data structures may be predefined by a user and take into account the severity of a potential use of the type of PII. In some embodiments, ranking (204) the PII (1020 may include determining the potential of the PII to identify a user. In some cases, some PII may be less likely than other PII to identify a user. Commonality of the information, for example, may increase or decrease the likelihood that the PII can be used to identify a user. A full name such as "John Smith" may be extremely unlikely to identify a particular user because of how common the name is while a less common name, such as "Gary Cudak" is much more likely to identify the particular user having that name.

The method of FIG. 2 also includes setting (206) a time limit (108) for the PII based on the rank (106). The application configured to carry out the example method of FIG. 2 may also be configured one or more data structures associating ranks to time limits. Higher ranks, for example, may be associated with lower time limits and vice versa. As such, setting (206) a time limit (108) may be carried out by searching a data structure associating time limits and ranks, to identify a time limit associated with the rank (106) generated for the PII.

Responsive to the time limit (108) elapsing (208), the method of FIG. 2 continues by performing (210) one or more actions to secure the PII. Performing (210) one or more actions to the secure the PII may be carried out in a variety of ways. In some embodiments, the actions may be user specified. In some embodiments, the actions may be predefined as part of the standard settings of the application configured to carry out the example method of FIG. 2. In some embodiments, both user specified actions and preconfigured actions may be employed. Examples of actions that may be performed (210) to secure the PII include any combination of: minimizing, on the computer system's display, one or more applications that include the PII; closing one or more applications that include the PII; clearing one or more portions of web browser history; clearing a clipboard containing information previously copied; altering screen saver settings; altering screen locking settings; altering a power saving policy for the computer system's display; altering the PII present on the computer system; encrypting one or more files including the PII; and others that will occur to readers of skill.

In some embodiments, the application may be configured to prompt a user prior to securing the PII and after the time limit elapses, while locking the user out of all possible ways to access the PII. Such a prompt may enable a user to enter user credentials override and cancel any actions that would otherwise be taken to secure the PII.

Figure 3:
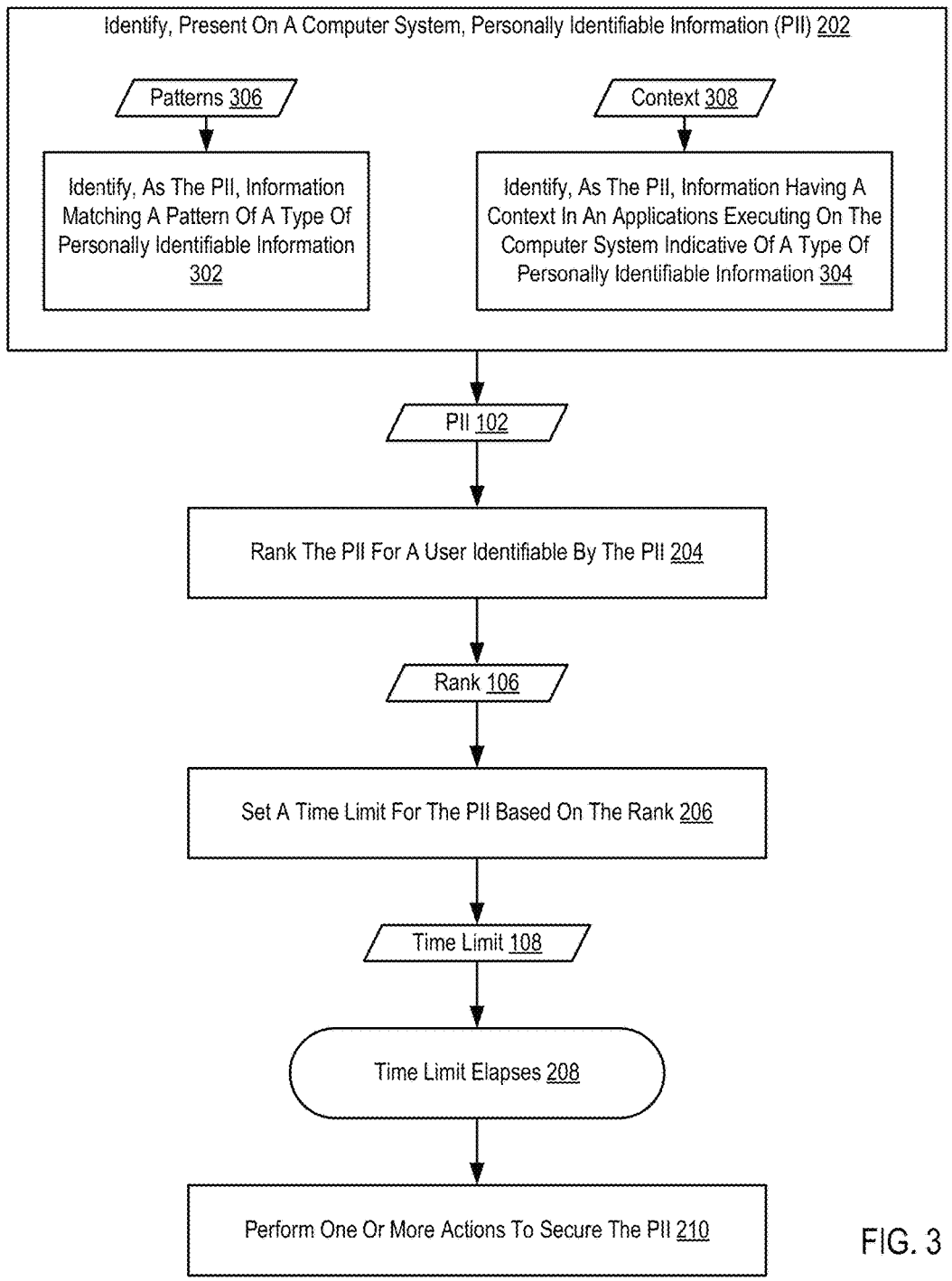
FIG. 3 sets forth a flow chart illustrating an example method for securing PII according to embodiments of the present disclosure.

For further explanation, FIG. 3 sets forth a flow chart illustrating an example method for securing PII according to embodiments of the present disclosure. The example method of FIG. 3 is similar the example method of FIG. 2 in that the example method of FIG. 3 may also be carried out by an application like that depicted in FIG. 1 and the method of FIG. 3 includes: identifying (202), present on a computer system, PII (102); ranking (204) the PII (102) for a user identifiable by the PII (102); setting (206) a time limit (108) for the PII (102) based on the rank (106); and, responsive to the time limit elapsing (208), performing (210) one or more actions to secure the PII.

The method of FIG. 3 differs from the method of FIG. 2, however, in that in the method of FIG. 3, identifying (202) PII (102) present on a computer system includes identifying (302), as the PII, information matching a pattern (306) of a type of personally identifiable information. Identifying (302) information matching a pattern (306) of a type of personally identifiable information may be carried out by matching text strings to predefined alphanumeric patterns. Examples of a predefined alphanumeric pattern may include a pattern in the form of "###-##-####" which represents a possible social security number, a pattern in the form of "##/##/##" which represents a possible birthdate, and so on. In some embodiments, the application configured to carry out the method of FIG. 3 may also be configured to track user input over time to form other patterns. A user, for example, may use a common pattern for passwords, even if the content of the password varies. Such a pattern, for example, may specify "Aaaa###," where "A" represents a capital letter, "a" represents a lower-case later, and # represents a number.

The method of FIG. 3 also differs from the method of FIG. 2 in that identifying (304) PII present on a computer system also includes identifying (304), as the PII, information having a context (308) in an application executing on the computer system indicative of a type of personally identifiable information. Identifying (304) information having a context (308) in an application executing on the computer system indicative of a type of PII may be carried out by identifying labels of fields in applications and associating the label with a type of PII. A field labeled "SSN" or "SS#," for example, may be provide context indicative of a social security number to any text input into the field by a user. Likewise, the application itself may provide context. In mobile computing environments, a financial application or banking application may be indicative that text provided in one or more screens, having a pattern matching that of bank account numbers, is a bank account number. These are but a few ways among many possible ways that PII may be identified. Readers of skill in the art will recognize that each such way may be the sole way or used in combination of other ways to identify PII in accordance with embodiments of the present disclosure.

Figure 4:
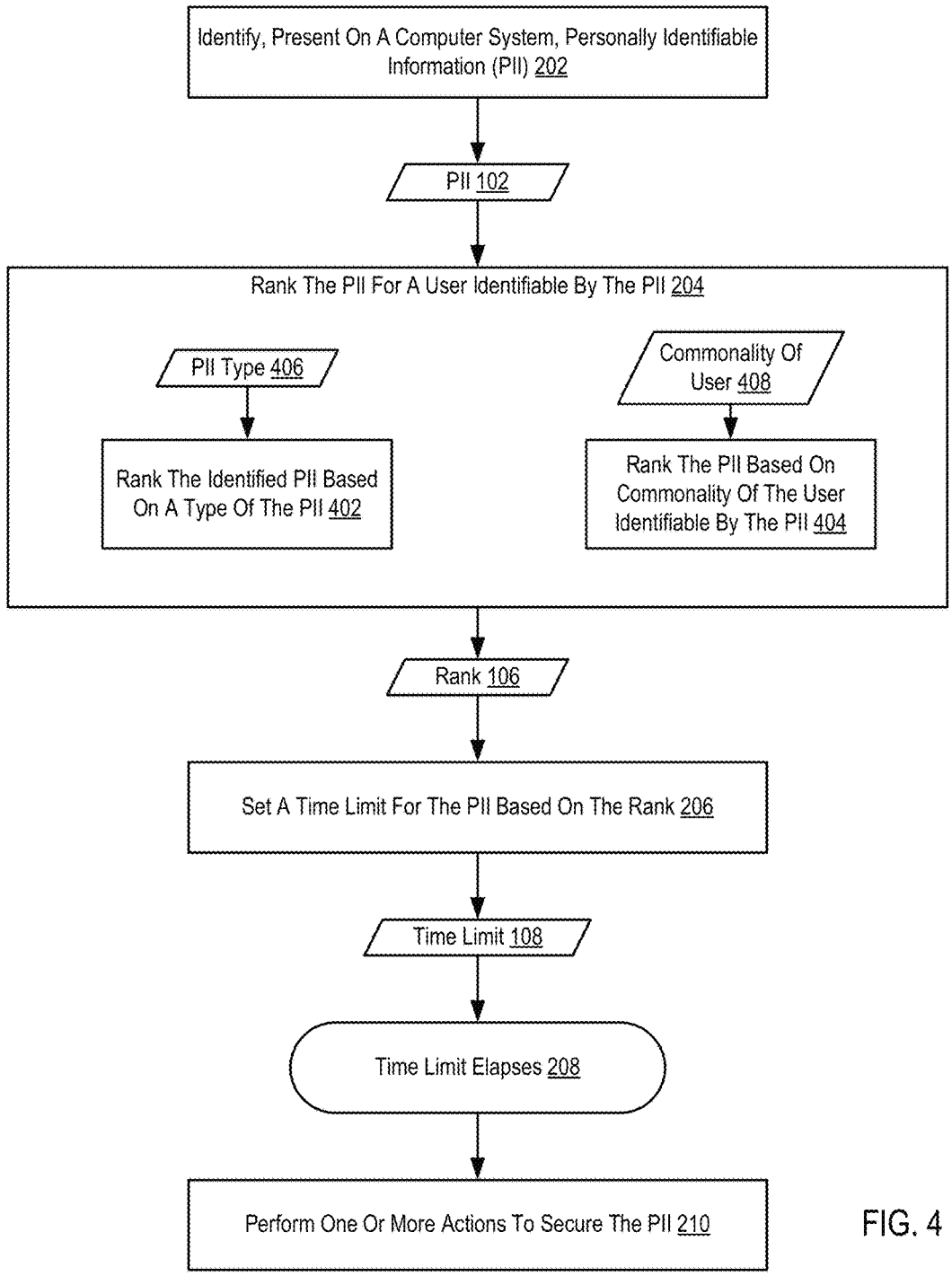
FIG. 4 sets forth a flow chart illustrating an example method for securing PII according to embodiments of the present disclosure.

For further explanation, FIG. 4 sets forth a flow chart illustrating another example method for securing PII according to embodiments of the present disclosure. The example method of FIG. 4 is similar the example method of FIG. 2 in that the example method of FIG. 4 may also be carried out by an application like that depicted in FIG. 1 and the method of FIG. 4 includes: identifying (202), present on a computer system, PII (102); ranking (204) the PII (102) for a user identifiable by the PII (102); setting (206) a time limit (108) for the PII (102) based on the rank (106); and, responsive to the time limit elapsing (208), performing (210) one or more actions to secure the PII.

The method of FIG. 4 differs from the method of FIG. 2, however, in that in the method of FIG. 4, ranking (204) the PII (102) for a user identifiable by the PII includes ranking (402) the PII (102) based on a type (406) of the PII and ranking (404) the PII based on commonality (408) of the user identifiable by the PII. Ranking (402) the PII (102) based on a type (406) of the PII may be carried out by identifying the type of the PII (possibly based on the alphanumeric pattern of the PII), identifying, from a data structure associating ranks to types of PII, a rank associated with the identified type of PII. Ranking (404) the PII based on commonality (408) of the user identifiable by the PII may be carried out in a variety of ways. In one example, the application may perform a search of the Internet through one or more search engines or search one or more particular websites (such as career websites, social media websites, and like) for the PII. The greater number of hits, the more common the name is, the lesser the number of hits, the less common the name is.

Figure 5:
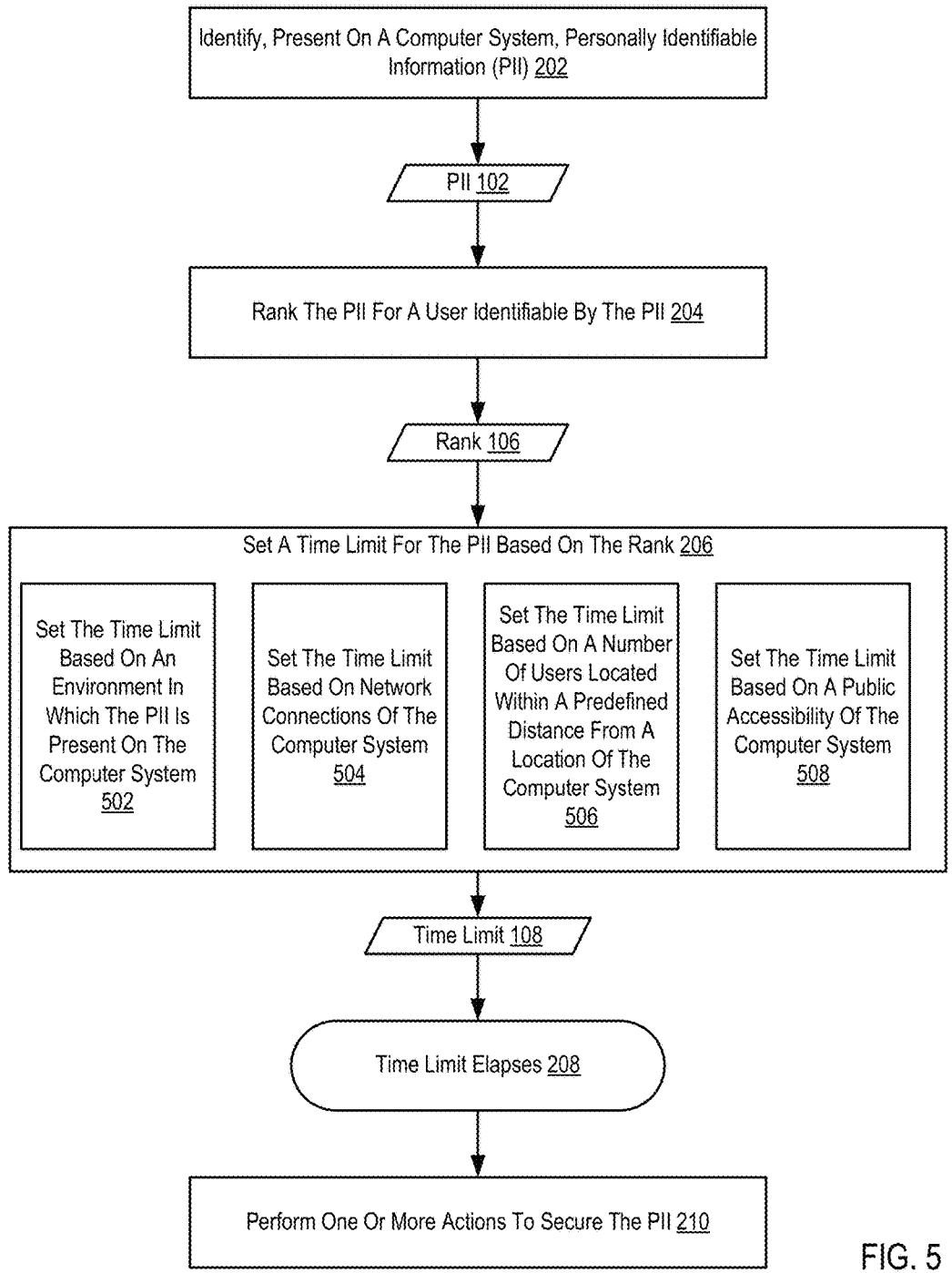
FIG. 5 sets forth a flow chart illustrating an example method for securing PII according to embodiments of the present disclosure.

For further explanation, FIG. 5 sets forth a flow chart illustrating another example method for securing PII according to embodiments of the present disclosure. The example method of FIG. 5 is similar the example method of FIG. 2 in that the example method of FIG. 5 may also be carried out by an application like that depicted in FIG. 1 and the method of FIG. 5 includes: identifying (202), present on a computer system, PII (102); ranking (204) the PII (102) for a user identifiable by the PII (102); setting (206) a time limit (108) for the PII (102) based on the rank (106); and, responsive to the time limit elapsing (208), performing (210) one or more actions to secure the PII.

The method of FIG. 5 differs from the method of FIG. 2, however, in that in the method of FIG. 2 setting (206) a time limit (108) for the PII (102) based on the rank includes setting (502) the time limit based on an environment in which the PII is present on the computer system. The term 'environment' as used here refers to document, clipboard, web history, file, or other data structure in which the PII is present and currently unsecured. To that end, setting (502) the time limit based on an environment in which the PII is present on the computer system may be carried out by identifying the environment in which the PII is present and determining a modification of the time limit set based solely on the rank, from a data structure including associations of environment types and modifications of time limits. For example, a data structure including associations of environment types and modification of time limits may associate a reduction in time limit of two minutes for PII that is present an open document that is active and in the foreground of an unlocked computer and a display that is on rather than asleep and dark. In another example, the data structure including associations of environment types to modification of time limits may associate an increase in the time limit of two minutes for PII that is included in file that is unopened and nested below many folders in a file system on a computer system.

In the method of FIG. 5, setting (206) a time limit (108) for the PII (102) based on the rank also includes setting (504) the time limit based on network connections of the computer system. Accessibility of the PII present on a computer system may be increased or decreased by the accessibility of the computer system itself via a network. If there are many network connections to the computer system and the computer system is not firewalled from these networks, the time limit may be reduced such that the PII is secured more quickly. If, by contrast, the computer system is unconnected to any network, or only a private network that is unconnected to the Internet, the time limit may be increased.

In the method of FIG. 5, setting (206) a time limit (108) for the PII (102) based on the rank also includes setting (506) the time limit based on a number of users located within a predefined distance from a location of the computer system. As the number of users in the physical vicinity of the computer system increases, the likelihood of an unauthorized user accessing the computer system, and possibly acquiring the PII, increases. As such, the time limit may be reduced as the number of users a predefined distance from the location of the computer system increases. To that end, setting (506) the time limit based on a number of users located within a predefined distance from a location of the computer system may be carried out in a variety of ways. In some embodiments, a computer system may be configured with one or more sensors to detect presence of users within a predefined area. In other embodiments, the application configured to carry out the method of FIG. 5 may perform one or more network operations, such as a ping, to identify computer systems that are on the same local area network and active. The greater number of active computer systems on the same local area network, the greater the likelihood that such computers are within a particular physical vicinity of the computer system on which PII is present and a greater likelihood that the users of such computers are likewise present.

In the method of FIG. 5, setting (206) a time limit (108) for the PII (102) based on the rank also includes setting (508) the time limit based on a public accessibility of the computer system. Some computer systems are known to be publicly accessible or available for use by many different users. Computers in a college computer laboratory, computers in a hotel business suite, and computers in a public library are all examples of computer systems with high public accessibility. Setting (508) the time limit based on a public accessibility of the computer system may be carried out by identifying the public accessibility of the computer system and modifying the time limit set based on the rank by decreasing the time limit as the public accessibility increases. Identifying public accessibility may be carried out in a variety of ways. The application configured to carry out the method of FIG. 5 may identify public accessibility by computer name, by IP address, from login records, by access control lists, and the like.

Figure 6:
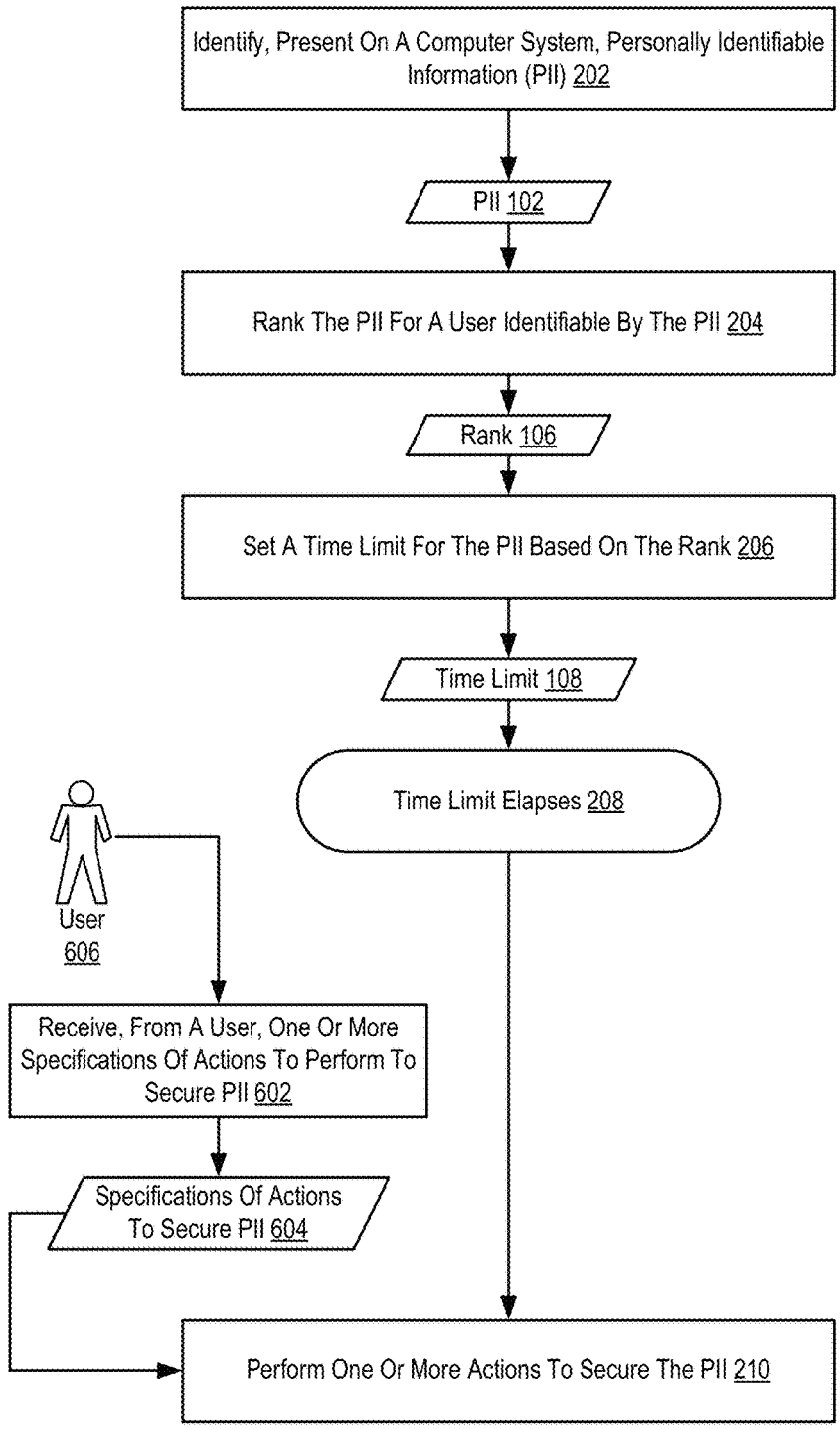
FIG. 6 sets forth a flow chart illustrating another example method for securing PII according to embodiments of the present disclosure.

For further explanation, FIG. 6 sets forth a flow chart illustrating another example method for securing PII according to embodiments of the present disclosure. The example method of FIG. 6 is similar the example method of FIG. 2 in that the example method of FIG. 6 may also be carried out by an application like that depicted in FIG. 1 and the method of FIG. 6 includes: identifying (202), present on a computer system, PII (102); ranking (204) the PII (102) for a user identifiable by the PII (102); setting (206) a time limit (108) for the PII (102) based on the rank (106); and, responsive to the time limit elapsing (208), performing (210) one or more actions to secure the PII.

The method of FIG. 6 differs from the method of FIG. 2, however, in that the method of FIG. 6 also includes receiving (602), from a user (606), one or more specifications (604) of actions to perform to secure PII. A user may be prompted, by the application configured to carry out the example method of FIG. 6, to select or specify various actions to carry out in various instances in which PII is identified as present on the computer system. The user may provide a single action to be carried out when any PII is identified and the time limit elapses, such as locking the computer. The user may provide a combination of actions when any PII is identified and the time limit elapses such as encrypting all files, clearing web browser history containing PII, clearing the clipboard and locking the computer system. The user may also provide PII type-specific actions or environment-specific actions such as "for PII comprising a social security number, lock the computer" and "for PII contained in a clipboard, clear the clipboard."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for securing personally identifiable information, comprising:
   by first program instructions executing on a computer system:
   identifying, present on the computer system and visible to users, personally identifiable information ('PII');
   ranking the PII according to a security risk associated with the PII, for a user identifiable by the PII;
   setting a time limit for the PII based on the rank, wherein a length of the time limit inversely corresponds to the rank of the security risk associated with the PII; and
   in response to detecting that the set time limit has elapsed, performing one or more preconfigured actions to secure the PII, wherein securing the PII visually restricts the PII and an application containing the PII from view.

2. The method of claim 1 wherein identifying PII present on a computer system further comprises identifying, as the PII, information matching a pattern of a type of personally identifiable information.

3. The method of claim 1 wherein identifying PII present on a computer system further comprises identifying, as the PII, information having a context in an application executing on the computer system indicative of a type of personally identifiable information.

4. The method of claim 1 wherein ranking the PII for a user identifiable by the PII further comprises ranking the PII based on a type of the PII and ranking the PII based on commonality of the user identifiable by the PII.

5. The method of claim 1 wherein setting a time limit for the PII based on the rank further comprises setting the time limit based on an environment in which the PII is present on the computer system.

6. The method of claim 1 wherein setting a time limit for the PII based on the rank further comprises setting the time limit based on network connections of the computer system.

7. The method of claim 1 wherein setting a time limit for the PII based on the rank further comprises setting the time limit based on a number of users located within a predefined distance from a location of the computer system.

8. The method of claim 1 wherein setting a time limit for the PII based on the rank further comprises setting the time limit based on a public accessibility of the computer system.

9. The method of claim 1 wherein performing one or more actions to secure the PII further comprises performing one or more of:
   minimizing, on the computer system's display, one or more applications that include the PII;
   closing one or more applications that include the PII;
   clearing one or more portions of web browser history;
   clearing a clipboard containing information previously copied;
   altering screen saver settings;
   altering screen locking settings;

altering a power saving policy for the computer system's display;

altering the PII present on the computer system; and encrypting one or more files including the PII.

10. The method of claim 1 wherein the one or more actions to secure the PII comprise user-specified actions.

11. An apparatus for securing personally identifiable information, comprising a computer processor and a non-transitory computer memory operatively coupled to the computer processor, the non-transitory computer memory having disposed within it computer program instructions that, when executed by the computer processor, cause the apparatus to carry out:

identifying, present on the computer system and visible to users, personally identifiable information ('PII');

ranking the PII according to a security risk associated with the PII, for a user identifiable by the PII;

setting a time limit for the PII based on the rank, wherein a length of the time limit inversely corresponds to the rank of the security risk associated with the PII; and in response to detecting that the set time limit has elapsed, performing one or more preconfigured actions to secure the PII, wherein securing the PII visually restricts the PII and an application containing the PII from view.

12. The apparatus of claim 11 wherein identifying PII present on a computer system further comprises identifying, as the PII, information matching a pattern of a type of personally identifiable information.

13. The apparatus of claim 11 wherein identifying PII present on a computer system further comprises identifying, as the PII, information having a context in an application executing on the computer system indicative of a type of personally identifiable information.

14. The apparatus of claim 11 wherein ranking the PII for a user identifiable by the PII further comprises ranking the PII based on a type of the PII and ranking the PII based on commonality of the user identifiable by the PII.

15. The apparatus of claim 11 wherein performing one or more actions to secure the PII further comprises performing one or more of:

minimizing, on the computer system's display, one or more applications that include the PII;

closing one or more applications that include the PII;

clearing one or more portions of web browser history;

clearing a clipboard containing information previously copied;

altering screen saver settings;

altering screen locking settings;

altering a power saving policy for the computer system's display;

altering the PII present on the computer system; and encrypting one or more files including the PII.

16. A computer program product for securing personally identifiable information, comprising a non-transitory computer readable medium, the non-transitory computer readable medium comprising computer program instructions that, when executed, cause a computer to carry out:

identifying, present on the computer system and visible to users, personally identifiable information ('PII');

ranking the PII according to a security risk associated with the PII, for a user identifiable by the PII;

setting a time limit for the PII based on the rank, wherein a length of the time limit inversely corresponds to the rank of the security risk associated with the PII; and in response to detecting that the set time limit has elapsed, performing one or more preconfigured actions to secure the PII, wherein securing the PII visually restricts the PII and an application containing the PII from view.

17. The computer program product of claim 16 wherein identifying PII present on a computer system further comprises identifying, as the PII, information matching a pattern of a type of personally identifiable information.

18. The computer program product of claim 16 wherein identifying PII present on a computer system further comprises identifying, as the PII, information having a context in an application executing on the computer system indicative of a type of personally identifiable information.

19. The computer program product of claim 16 wherein ranking the PII for a user identifiable by the PII further comprises ranking the PII based on a type of the PII and ranking the PII based on commonality of the user identifiable by the PII.

20. The computer program product of claim 16 wherein performing one or more actions to secure the PII further comprises performing one or more of:

minimizing, on the computer system's display, one or more applications that include the PII;

closing one or more applications that include the PII;

clearing one or more portions of web browser history;

clearing a clipboard containing information previously copied;

altering screen saver settings;

altering screen locking settings;

altering a power saving policy for the computer system's display;

altering the PII present on the computer system; and encrypting one or more files including the PII.

* * * * *